March 25, 1952

C. A. COOK 2,590,089

CLUTCH BRAKE

Filed Dec. 10, 1947

INVENTOR.
Charles A. Cook
BY
Strauch & Hoffman
Attorneys

March 25, 1952     C. A. COOK     2,590,089
CLUTCH BRAKE

Filed Dec. 10, 1947     2 SHEETS—SHEET 2

INVENTOR.
Charles A. Cook
BY
Strauch & Hoffman
Attorneys

Patented Mar. 25, 1952

2,590,089

UNITED STATES PATENT OFFICE 2,590,089

CLUTCH BRAKE

Charles A. Cook, Oshkosh, Wis., assignor to The Timken-Detroit Axle Company, Detroit, Mich., a corporation of Ohio Application December 10, 1947, Serial No. 790,834

14 Claims. (Cl. 192—13)

This invention relates generally to friction clutch construction and more specifically to friction clutch construction wherein the driven member is restrained against undesired rotation when the clutch is disengaged.

When the usual automotive friction clutches, particularly those in which the drive and driven members operate in a housing containing liquid, are disengaged, a slight amount of undesired torque is imparted from the driving member to the driven member, due for example to drag of the liquid in which the clutch operates. In most cases this torque is insufficient to overcome the resistance to rotation of the mechanism to which the driven clutch member is secured. However, when the driven member is connected to a power take-off shaft, as in a tractor or similar vehicle, the torque imparted to the disengaged clutch member is generally sufficient to rotate the power take-off shaft unless the latter is connected to drive auxiliary machinery. The present invention provides for braking the disengaged clutch member to prevent undesired rotation of such power take-off and similarly driven shafts.

It is therefore the major object of the invention to provide a friction clutch embodying novel means to restrain rotation of the driven clutch member when the clutch is disengaged.

Another object of the invention is to provide a friction clutch construction wherein a shift collar is secured for rotation with the driven clutch member and a novel brake arrangement is associated with the shift collar.

It is a further object of the invention to provide a friction clutch construction having a shift member rotatable with the driven clutch member, actuating mechanism for the shift member, and a novel brake arrangement between the actuating mechanism and the shift member.

Further objects of the invention will appear as the description proceeds in connection with the appended claims and the annexed drawings wherein:

The specification proceeds with continued reference to the drawings wherein like numerals designate like parts throughout the several figures.

Figure 1:
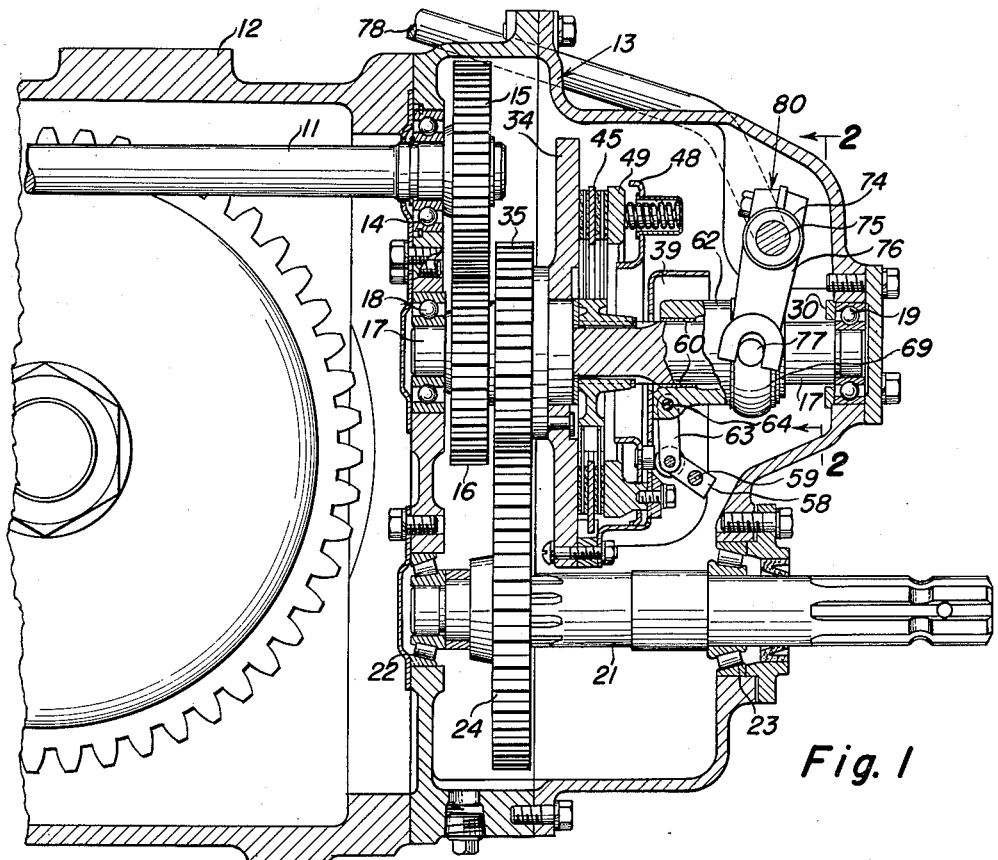
Figure 1 is an elevational view, in cross-section, of part of the rear end of a tractor having a power take-off incorporating a novel clutch construction according to a preferred embodiment of the invention.
Figure 2:
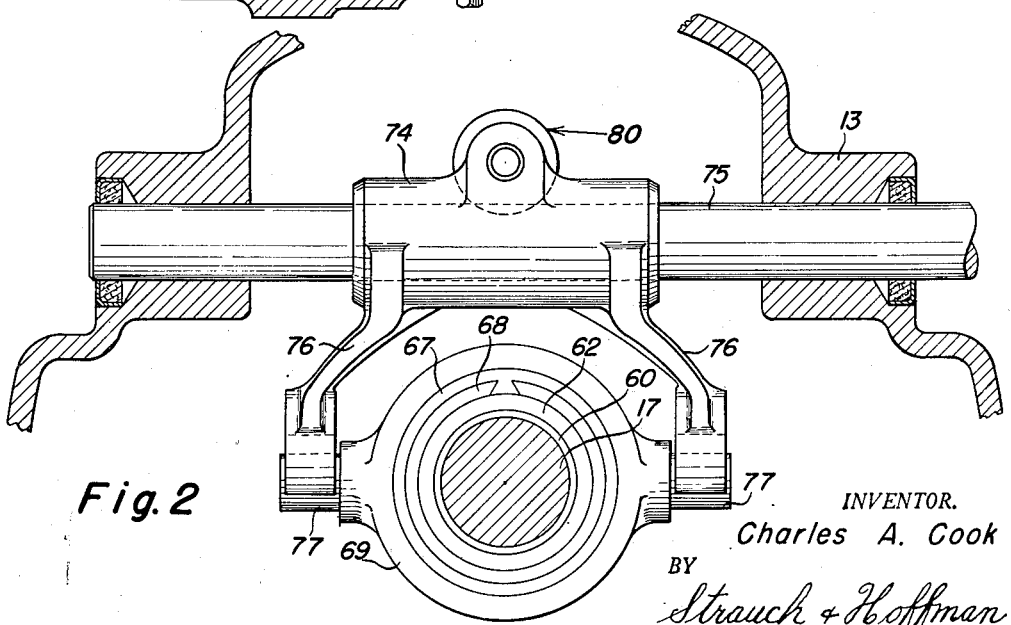
Figure 2 is a section taken substantially along line 2—2 of Figure 1 and illustrating details of the clutch actuating linkage.

An input shaft 11 is connected to be driven by an engine (not shown) mounted at the front end of the tractor drive mechanism housing generally indicated at 12. Shaft 11 may be driven constantly when the vehicle engine is operating so as to provide power for rotating the power take-off shaft when the vehicle is not moving. Shaft 11 extends through the rear wall of housing 12 into a housing 13 which is substantially filled with oil and encloses the power take-off drive mechanism. Shaft 11 is supported by a bearing 14 where it enters housing 13 and has rigidly secured upon its rear end a gear 15. Gear 15 is meshed with a gear 16 non-rotatably mounted on a rotatable clutch shaft 17 which is disposed below input shaft 11 and is supported at opposite ends by bearing 18 in the front wall of housing 13 and a bearing 19 in the rear wall of housing 13. A power take-off shaft 21 which is parallel to shafts 11 and 17 and disposed below shaft 17 is rotatably supported in bearings 22 and 23 in the front and rear walls respectively of housing 13, and projects rearwardly from housing 13 to be available for auxiliary drive purposes. A gear 24 is non-rotatably secured on power take-off shaft 21, and a suitable clutch such as that to be described below is provided for selectively driving the power take-off shaft from clutch shaft 17 which is constantly rotating.

The driving clutch member (Figure 3) comprises a hub 25 non-rotatably mounted on splines 26 on clutch shaft 17. Two friction discs 27 and 28 are conventionally mounted on hub 25 in such manner as to secure the discs against rotation on the hub but to permit displacement of the friction surfaces of the discs axially of the hub during clutch operation. Hub 25 is secured against axial displacement on splines 26 as by locking ring 32 and a spacer ring 33.

The driven clutch member includes a backing plate 34 rigidly secured upon a gear 35 as by rivets 36. Gear 35 is constantly meshed with gear 24, and is journalled on a bearing shell 37 surrounding a sleeve 38 splined to shaft 17. Gear 35 abuts spacer ring 33 at one end and abuts the hub of gear 16 at its other end so that the driven clutch member is fixed against axial displacement along clutch shaft 17.

A rigid support 39, apertured at 41 to permit free passage of shaft 17, is secured in axially spaced relation to plate 34 as by bolts 42 passing through a plurality of axially disposed support legs 43 extending toward the periphery of backing plate 34. A spacer block 44 is secured between the support and backing plate. The previously described driving clutch member on hub 25 is disposed in the axial space between backing plate 34 and support 39. An annular disc 45 is disposed between friction discs 27 and 28 of the driving member and at its periphery is formed with projections 46 that extend into suitable axial slots 47 on spacer 44 so that disc 45 is mounted for rotation with backing plate 34 and support 39 while being permitted axial movement with respect thereto.

Figures 3, 4:
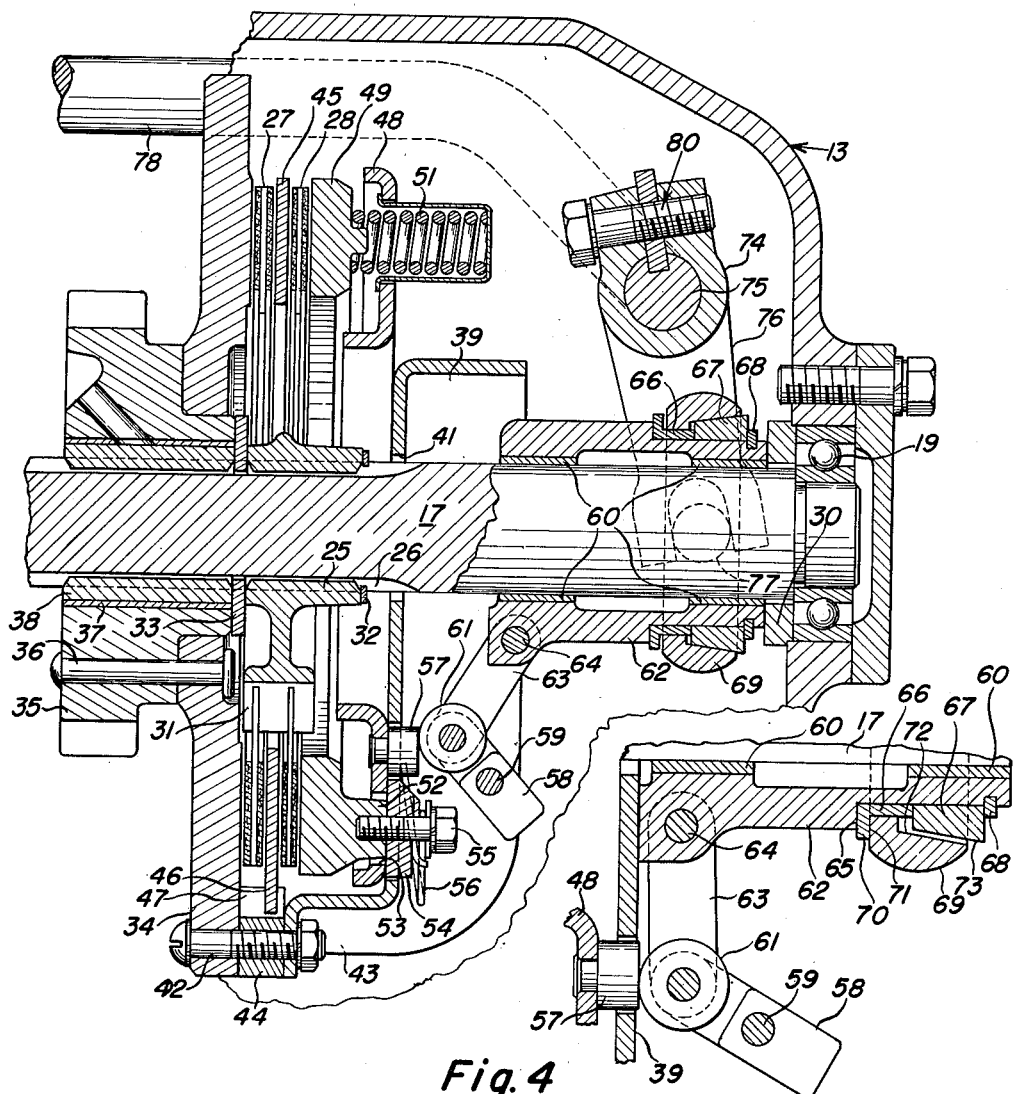
Figure 3 is an enlarged section illustrating the novel clutch mechanism of the invention in more detail.
Figure 4 is an enlarged fragmentary detail in section showing the clutch brake released.

A carrier ring 48 and a pressure plate 49 are disposed between the rearmost clutch face of the driven clutch member and support 39, and are secured for rotation with the support but permitted to move axially thereof. The pressure plate and carrier ring are resiliently held in spaced relationship by a plurality of circumferentially spaced compression springs 51 disposed between the plate and the ring. Axial movement of carrier ring 48 to the right in Figure 3 is limited by its abutment against the support 39. Pressure plate 49 is formed with a circumferential series of bosses 52 that project through apertures 53 in ring 48, and suitable apertures in support 39, and blocks 54 larger than apertures 53 are secured to the bosses by studs 55. Compression springs 56 reacting between the stud heads and support 39 resiliently urge plate 49 toward support 39 so as to take up axial play in springs 51.

A plurality of circumferentially spaced bosses 57 are riveted on carrier ring 48 and extend rearwardly through suitable apertures in support 39. A corresponding number of links 58 are pivoted on pins 59 on support 39, and each link carries a free roller 61 in peripheral contact with a boss 57.

A clutch shift collar 62 is slidably and rotatably mounted on clutch shaft 17 between support 39 and rear wall of housing 13, bushings 60 being provided on the collar. A plurality of levers 63 each pivoted to the collar at 64 and to the links 58 on the axis of rollers 61 are provided.

With reference to Figure 3, the clutch is shown disengaged and movement of clutch shift collar 62 to the left in Figure 3 into the position shown in Figure 1 will engage the clutch. As clutch collar 62 moves to the left, levers 63 and links 58 turn about their respective pivots and shift rollers 61 substantially axially in the same direction. Rollers 61 bearing against bosses 52 move carrier ring 48 to the left, thereby compressing springs 51 and urging the adjacent coextensive friction surfaces of backing plate 34, friction discs 27 and 28, annular plate 45 and pressure plate 49 together for causing the driven clutch member to rotate with the driving clutch member.

Clutch engaging movement of shift collar 62 to the left in Figure 3 is stopped by its abutment with support 39. As illustrated in Figures 1 and 4, when collar 62 is in abutment with support 39, the clutch is engaged and the pivot 64 of lever 63 has crossed over to the left of a vertical plane containing the axes of rollers 61 thereby forming a toggle lock which enables the force of compression springs 51 to retain the clutch members engaged.

At its rear end collar 62 is shouldered at 65 to provide a reduced portion on which are press-fitted in succession a bearing ring 66 in abutment with shoulder 65, and a brake ring 67 in abutment with ring 66. A snap ring and groove assembly at 68 retains the bearing and brake rings against axial movement. A shift yoke 69 is journalled on bearing ring 66 which is formed with a radial flange 70 providing a stop face 71. A rearwardly facing tapered bore 72 is provided in the shift yoke and brake ring 67 has its outer peripheral surface 73 tapered to correspond to bore 72. Shift yoke 69 is of such axial dimensions that it cannot be in abutting contact with both stop face 71 and brake surface 73 at the same time so that a limited small sliding movement is permitted between the yoke and the clutch shift collar.

A shift fork 74 is non-rotatably secured to a transverse rod 75 disposed above collar 62, as by the fastening assembly indicated at 80, and journalled in the side walls of housing 13. Fork 74 is provided with a pair of notched arms 76 straddling shift yoke 69 and engaged with pins 77 projecting from the yoke, thereby rendering the yoke non-rotatable so that the collar 62 may rotate with respect to the yoke. Externally of housing 13, a clutch operating lever 78 preferably integral with one end of transverse rod 75 extends toward the front of the vehicle. Rocking of lever 78 about the axis of rod 75 causes shift fork 74 to be pivoted within the housing and shift collar 62 axially along the clutch shaft for engaging or disengaging the clutch.

With lever 78 in the upper position illustrated in Figure 1, clutch collar 62 is in its foremost position with the driving and driven clutch elements engaged.

When it is desired to disengage the clutch and stop movement of the power take-off shaft, lever 78 is rocked counterclockwise to the position of Figure 3. During rocking of lever 78 and rod 75, yoke 69 and collar 62 are moved together rearwardly to the position of Figure 3 where the clutch is disengaged. Rearward movement of collar 62 (to the right in Figure 3) is preferably arrested by contact with a suitable stop ring 30 after clutch disengagement. Then the continued force exerted on the yoke through lever 78 tends to move yoke 69 rearwardly with respect to collar 62 and urge braking surfaces 72 and 73 into adequate frictional braking engagement.

In the clutch disengaged position, the force arising from the weight and extended length of lever 78, even after the operator's hand is removed therefrom, continues to bias fork 74 counter-clockwise and thereby continues to urge the non-rotatable brake yoke 69 rearwardly against ring 67 to brake any tendency of collar 62 to rotate. Since collar 62 does not rotate about its axis relatively to the driven clutch member, because of the linkage connection at 58, 63, restraint of rotation of collar 62 is effective to prevent rotation of the driven clutch member and the power take-off shaft connected to it.

When the clutch is being engaged, during the clockwise movement of lever 78, yoke 69 slides forwardly to abut stop face 71 and pick up collar 62. The force exerted by lever 78 in the clutch engaged position of Figure 1 is substantially less than the clutch engaging force provided by the toggle lock and springs 51 above described.

It will be appreciated that the above described friction clutch structure is illustrative only and that the brake arrangement of the invention is equally applicable to any equivalent friction clutch and collar assembly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a friction clutch assembly, rotatable driving and driven clutch members, a shift collar operatively connected to, axially slidable with respect to, and rotatable with the driven clutch member, means operatively connected to said collar for controlling axial movement thereof and coacting means on said collar and said control means actuated by said control means for restraining rotation of said collar and the associated driven clutch member when the clutch members are disengaged.

2. In a friction clutch assembly, rotatable driving and driven clutch members, a movable shift collar operatively connected to, rotatable with, and axially shiftable with respect to the driven clutch member, a control member, motion transmitting mechanism connecting said control member to said collar for moving said shift collar, relatively rotatable brake members mounted on said shift collar, one of said brake members being rotatable with said collar and means in said mechanism holding the other brake member against rotation with said collar, said mechanism being operated by movement of said control member for affecting disengagement of said clutch members to apply said brake members to each other to restrain rotation of said collar and the driven clutch member.

3. In a friction clutch assembly wherein driving and driven clutch members are adapted to be selectively engaged or disengaged, a clutch shift collar operatively connected to the driven clutch member, rotatable therewith, and axially shiftable relative thereto, means for said collar to engage or disengage said clutch members, and coacting brake means on said collar and said actuating means for restraining rotation of the collar and driven clutch member when the clutch members are disengaged.

4. In a friction clutch, a driven clutch member, a shift collar rotatable with and operatively connected to the driven clutch member, means for shifting said collar relative to said driven clutch member to engage or disengage the clutch members including mechanism rotatably and slidably connected to said collar and means on said collar providing limited relative sliding between said mechanism and said collar, and coacting brake surfaces on said mechanism and said collar engageable to restrain the collar against rotation when the clutch is disengaged.

5. In a friction clutch, a driven clutch member, a shift collar operatively connected to and rotatable with the driven clutch member, a member mounted on said collar for relative rotatable and slidable movement therebetween, means for limiting sliding movement of said member relative to the collar, a rockable control member connected to said member for shifting said collar, and coacting brake surfaces on said first named member and collar engageable for restraining rotation of the collar when the clutch members are disengaged.

6. In a friction clutch assembly comprising driving and driven clutch members adapted to be selectively engaged or disengaged, a slidable clutch shift collar operatively connected to, rotatable with, and axially shiftable relative to the driven clutch member, a clutch shift yoke surrounding said collar but held against rotation about the axis of said collar, means for actuating said yoke to shift the collar for engaging or disengaging the clutch members, and coacting brake surfaces on said collar and yoke engaged when the clutch members are disengaged to prevent undesired rotation of said driven clutch member.

7. In a friction clutch assembly comprising driving and driven clutch members adapted to be selectively engaged or disengaged, a clutch shift collar operatively connected to, and rotatable with, and axially shiftable relative to the driven clutch member, a clutch shift yoke operably engaging said collar and having limited longitudinal sliding movement with respect to said collar said shift collar being rotatable with respect to said yoke, means for restraining rotation of the yoke about the axis of said collar, means for longitudinally shifting said yoke, and coacting brake surfaces on the yoke and collar engaged to restrain rotation of said collar when the latter is moved toward its position corresponding to the disengaged position of said clutch members.

8. In a friction clutch assembly comprising driving and driven clutch members adapted to be engaged or disengaged, a clutch shift collar operatively connected to, rotatable with, and longitudinally shiftable relative to the driven clutch member, said collar having a peripheral brake surface, a longitudinally movable yoke operably engaging said collar, said collar being rotatable relative to said yoke, means restraining said yoke against rotation with said collar, means for effecting longitudinal displacement of the collar by shifting said yoke, and a brake surface on said yoke coacting with the brake surface on the collar to restrain rotation of the driven clutch member when the clutch members are disengaged.

9. In a friction clutch assembly, a rotatable driven clutch member, shift collar operatively connected to, axially movable relative to, and rotatable with the driven clutch member, a yoke so mounted on said collar as to permit relative rotation therebetween, a pivoted fork operatively connected to said yoke and restraining said yoke against rotation with said collar, an operating lever for said fork, a stop for arresting movement of said collar in the clutch member disengaging direction, coacting brake surfaces on said yoke and collar, and means providing limited relative longitudinal movement between said yoke and collar, said lever being disposed to bias the brake surface of said yoke into frictional braking engagement with that of said collar when said collar engages said stop.

10. A friction clutch mechanism comprising a driving member, a driven clutch member, means for frictionally engaging said driving and driven members including a shift collar mounted for longitudinal movement relative to and rotatable with the driven member, a non-rotatable shift yoke operatively connected to said collar, and means for frictionally engaging said non-rotatable yoke with said collar to thereby restrain the rotation of the driven clutch member when the clutch members are disengaged.

11. A friction clutch mechanism comprising a clutch shaft, a driving member non-rotatably secured to the shaft, a driven member journalled on the shaft, mechanism for engaging the driving and driven members including a shift collar secured for rotation with the driven member and slidably journalled on the shaft and provided with a friction surface, a non-rotatable shift yoke surrounding and slidably mounted for a limited distance upon the collar and having a second friction surface adjacent the first friction surface, and means to urge said friction surfaces into frictional contact in order to restrain the rotation of the driven member when the clutch members are disengaged.

12. In a friction clutch, a rotatable clutch shaft, a driving member non-rotatably mounted on said shaft, a driven member journalled on said clutch shaft, a shift collar secured for rotation with the driven member and mounted for sliding movement on the shaft relative to said driven member for engaging the driven member with said driving member, a stop for arresting movement of said collar in clutch disengaging direction, a non-rotatable shift yoke mounted for limited sliding movement on the collar, and a lever assembly connected to the yoke for actuating the shift collar, said lever assembly being so arranged that its weight forces the non-rotatable yoke into frictional engagement with the collar when said collar is arrested by said stop and thereby restrains the rotation of the driven member when the clutch is disengaged.

13. In a friction clutch having driving and driven members, an axially slidable shift collar therefor operably connected to, rotatable with, and axially shiftable with respect to the driven member, a non-rotatable yoke mounted on said collar to permit relative rotation and sliding movement therebetween, means for actuating said yoke to axially shift said collar in one direction to effect clutch engagement including means limiting sliding movement of said yoke relative to said collar, and means for actuating said yoke in the opposite direction to effect clutch disengagement including coacting braking surfaces on the yoke and collar acting to restrain rotation of the collar and associated driven member when the clutch members are disengaged.

14. In a friction clutch assembly having rotatable driving and driven members adapted to be engaged or disengaged, a shift member operably connected to said driven member for rotation therewith and axial movement with respect thereto, actuating means for said shift member, and coacting brake elements fixed relative to said actuating means and shift member respectively for restraining rotation of the driven clutch member when the clutch members are disengaged.

CHARLES A. COOK.

REFERENCES CITED

The following references are of record in the file of this patent:

UNITED STATES PATENTS

| Number | Name | Date |
|---|---|---|
| 1,089,171 | Wigginton | Mar. 3, 1914 |
| 1,241,060 | Vincent | Sept. 25, 1917 |
| 1,624,025 | Tessky | Apr. 12, 1927 |

FOREIGN PATENTS

| Number | Country | Date |
|---|---|---|
| 379,943 | France | Nov. 22, 1907 |
| 583,300 | France | Oct. 29, 1924 |